United States Patent [19]

Manusch et al.

[11] Patent Number: 4,851,076

[45] Date of Patent: Jul. 25, 1989

[54] ADHESIVE FILM APPLICATOR

[75] Inventors: Christoph Manusch, Hanover; Hans J. Harp, Hemmingen, both of Fed. Rep. of Germany; Roy van Swieten, BP s'Hereogenbosch, Netherlands

[73] Assignee: PELIKAN Aktiengesellschaft, Hanover, Fed. Rep. of Germany

[21] Appl. No.: 120,302

[22] Filed: Nov. 13, 1987

[30] Foreign Application Priority Data

Nov. 13, 1986 [DE] Fed. Rep. of Germany ....... 3638722

[51] Int. Cl.[4] ............................................. B32B 35/00

[52] U.S. Cl. .................................... 156/577; 156/579; 156/584

[58] Field of Search ............... 156/577, 579, 584, 523, 156/527, 540

[56] References Cited

U.S. PATENT DOCUMENTS

| | | | |
|---|---|---|---|
| 2,918,189 | 12/1959 | Frohbach et al. | 156/577 |
| 3,930,697 | 1/1976 | Barouh et al. | 312/39 |
| 3,969,181 | 7/1976 | Seabold | 156/577 |
| 4,288,276 | 9/1981 | Schrotz et al. | 156/577 |
| 4,357,198 | 11/1982 | Ezquerro | 156/527 |
| 4,447,482 | 5/1984 | Heinzelman et al. | 156/584 |
| 4,576,311 | 3/1986 | Horton et al. | 156/584 |
| 4,718,971 | 1/1988 | Summers | 156/540 |

FOREIGN PATENT DOCUMENTS

| | | |
|---|---|---|
| 1911615 | 10/1969 | Fed. Rep. of Germany . |
| 2116984 | 5/1972 | Fed. Rep. of Germany . |
| WO83/02586 | 8/1983 | PCT Int'l Appl. . |
| 1009607 | 11/1965 | United Kingdom . |

*Primary Examiner*—Michael Wityshyn

*Attorney, Agent, or Firm*—Herbert Dubno

[57] ABSTRACT

An applicator for adhesive film to a surface has a supply spool for tape carrying the film and a take-up member coupled to the supply spool by a drive mechanism. The tape passes around an applicator member which is resiliently mounted on the housing and can press the tape against the substrate so that the adhesive film is transferred to the latter.

22 Claims, 3 Drawing Sheets

ADHESIVE FILM APPLICATOR

FIELD OF THE INVENTION

Our present invention relates to an adhesive-film applicator and, more particularly, to an applicator of the type in which a spool of an adhesive tape, i.e. an adhesive film detachably adherent to a carrier or support strip, pays out the tape over a transfer device which presses the film against the substrate, and has means for taking up the support strip, thereby peeling it from the adhesive film which remains adherent to the substrate.

BACKGROUND OF THE INVENTION

It is known to provide an applicator which has a spool of the tape, defined as the support strip and the adhesive film detachably adherent thereto, and a take-up spool or means on a structure which is swingable out of the housing to allow access to the spools.

In conventional devices of this type, as in a sound-recording cassette, the supply spool and the take-up device are provided in a common plane and the supply spool carries a multiplicity of turns of the support strip coated with the adhesive film such that the adhesive film tends to adhere to the substrate with a greater force than it is adherent to the support strip, whereby upon movement of the applicator over the substrate or movement of the substrate, which can be paper, past the applicator, the tape is moved through a corresponding distance and the adhesive film from this tape is transferred to the substrate.

The take-up device can be analogized to the take-up spool of a sound-recording cassette. The take-up device and the supply spool can be mounted on a structure adapted to be swung out of a housing to allow replacement of the supply spool when the latter is empty and removal of the coil of the strip from which the adhesive film has been detached.

On the outer side of the housing, and indeed on a small side thereof, the transfer device is provided.

The film-coated strip, i.e. the transfer tape, is directed out of the housing and has its nonadhesive surface engaged by or passing over the transfer unit so that the opposite or obverse side of the tape, upon which the adhesive film is provided can be brought into contact with the substrate.

As a rule, the applicator is moved by hand over the substrate and the adhesive film is thereby separated from the tape, the depleted strip being wound up in a coil on the take-up device.

To facilitate the take-up of the depleted strip, a transmission can be provided between the supply spool and the take-up device to ensure that the tape will remain under tension between the take-up device and the supply spool while passing around the transfer device. In general, the transfer device has comprised a bar or roller around which the tape was stretched.

To maintain the tension with the aforementioned transmission, a slip clutch is provided in the transmission so that the transmission can ensure, as in a sound-recording cassette, that the take-up device will be driven at a speed, under all operating conditions, which is sufficient to maintain the tape under tension, around the transfer member. In practice, the transmission has utilized a belt or spiral spring loop which form the slip clutch or provided self-slip in the transmission with the effect of a slip clutch or a gear drive in conjunction with a separate slip clutch.

When in the application of the adhesive film to a substrate, the device was canted or when the substrate was not absolutely even or could not be placed in a planar orientation so that the applicator could contact the substrate only along one side of the application, there was an uncontrolled tearing of the adhesive film. This resulted not only in the application of an unsatisfactory adhesive film trace to the substrate, but also could prevent the advance of the tape and thus the take-up of the depleted strip. The further application could result in the emplacement of only a torn film or an interruption in operation by contamination of the applicator itself with pieces of the adhesive film and possibly even bunching or jamming of the tape so that a significant effort was required to clear and clean the applicator.

In an effort to reduce the effect of this drawback, it has been proposed to broaden the transfer device with portions of either side of the applicator film intended to come into contact with the substrate. In this case, upon a canting of the applicator with respect to the substrate for any reason, the adhesive film does not come into partial contact with the substrate and hence is not torn. Furthermore, the breadth of the transfer device can be such that it is practically impossible to maintain the applicator in a tilted orientation with respect to the substrate through inadvertence.

After a completed transfer of the adhesive film, the device is usually lifted from the substrate and, as a result, the user generally does not have any control of the angle with which the film bridge between the substrate and the tape extends. Best results are obtained when this angle is a right angle since then there is the best possibility of a tear of the adhesive film in a straight transverse line. In practice, however, the inability to ensure a right angle between the edges of the applied film and the film stretch which arises from lifting results in an accordian-pleated or corrugated terminal portion of the film with the further disadvantage that the starting edge for the application of the next trace may also be irregular.

Where the tear involves sharp points in the film, these tend to be pulled back in a spring-like manner and as a result can produce a film thickness many times greater than the applied film thickness which is desired. Indeed, when the adhesive film of the invention is used to attach other objects to the substrate, the bumps resulting from the imprecise separation of the adhesive film may be visible through an article which is mounted on the substrate.

It has been proposed further to avoid the latter disadvantage by providing a brake on the device which can be actuated by hand to restrain the supply of the transfer tape and thus permit a more precise rupture of the film.

The actuation of such a brake, however, requires a higher degree of coordination of the user since the user must then coordinate a variety of movements and this, for ergonomical reasons, may be undesirable because the applicator must then be capable of accommodation to different hand sizes and different use positions.

In the use of such an applicator, moreover, certain boundary conditions play a role, these boundary conditions limiting the major dimensions of the device. The most critical dimensions are, of course, the height and length of the applicator in its direction of movement since these dimensions determine the utility of the device in applying the film to the inner surface of a vessel, a box or chest or the like.

These major dimensions, in turn, limit the size of the spool which can be used since the spool must be sufficiently small that it can be accommodated in the housing. Naturally, a small spool requires that the device be refilled more often and may make the applicator uneconomical to use because of its labor-intensive nature.

It is frequently also desirable that the device have accommodation for a reserve spool of the film-coated tape. This is problematical with conventional devices with axes for the supply spool and the take-up core which are parallel to the horizontal. Indeed in such systems, there is no possibility of an accommodation for reserve spools. If one wishes to provide a reserve spool, an additional structure must be provided on the outside of the housing and this additional compartment which projects laterally of the housing is always susceptible to damage.

Finally it has been considered to be desirable to provide a device which will enable one to readily ascertain the type of tape which is loaded in the applicator from the exterior and hence the nature of the film, e.g. its color, and to determine the quantity of the tape which remains on the spool.

As we have already noted, once the tape is fully used, the coil on the take-up device is removed and the empty supply spool is replaced by a full supply spool.

Conventional applicators have the disadvantage that the replacement manipulations must be effected within the housing of the device since the spools and the drive mechanism in the interior of the housing are integrated and therefore not readily accessible. The fingers must be inserted into the housing and frequently much of the spool replacement and emptying can only be done by finger feel. The proper positioning of the tape in the transfer device and the guide passages, the fastening of the tape on the take-up device and even the positioning of the new supply spool may require considerable time and skill, especially where there is little space for such manipulations in the housing.

Of course, if the supply spool is inserted incorrectly, i.e. in an inverted manner, it must be removed and replaced and there is always the danger that the adhesive film will contaminate parts which are never intended to contact the film.

Excessive manipulation and possibly erroneous positioning of the tape and the spool and excessive handling of the take-up coil can result in the deposition of particles of the adhesive in the body of the apparatus and even the contamination of the gear teeth or the drive so that the slip clutch may become ineffective or may shift its operating point in some detrimental fashion.

Furthermore, in conventional devices there was always the danger that an incorrect spool with an adhesive film which was not proper for a particular application could be inserted and as a result damage the device or interfere with an effective operation of it. Of course the film which might then be applied may not correspond to the wishes of the user.

OBJECTS OF THE INVENTION

It is the principal object of the present invention, therefore, to provide an improved device for the application of an adhesive film trace to a substrate which avoids the drawbacks of prior art applicators as developed above.

Another object of this invention is to provide an application for the purposes described which will allow the exact edge-sharp adhesive film application with an unobjectionable tear edge.

It is also an object of the invention to provide a simple, easily handled, easily filled and easily used applicator which is not materially affected by slight canting phenomena of the type which have been found to be detrimental heretofore in the use of conventional applicators for this purpose.

SUMMARY OF THE INVENTION

These objects and others are attained, in accordance with the invention, in an applicator of the type in which the adhesive film tape passes from the supply spool to a take-up device coupled with the supply spool via a transmission including a slip clutch over a transfer device which, according to the invention, is elastically mounted in the housing.

Because of the elastic mounting of the transfer device, even if the housing should be canted somewhat or the substrate is uneven to some extent or does not lie flat, the transfer device can engage in a compensating movement on the substrate to ensure a uniform tracing pressure of the tape and hence the film against the substrate over the entire width of the transfer device.

Advantageously, the transfer device is a bar or rib which is elastically deflectable or is mounted on an elastically bendable substantially rectangular intermediate member. The elastically bendable intermediate member can be realized in an especially simple manner by reducing its wall thickness relative to the transfer bar so that it acts as a leaf spring with respect to the latter.

The elastic mounting means for elastically mounting the applicator member on the housing can also comprise, alternatively, two indentations which are located directly above the applicator member, spaced apart from one another and extending into small sides of the connection between the application member and the housing in a wasp-waist configuration to define a reduced cross section which increases the elastic flexibility. The width of the waist can be smaller than the foot thickness of the applicator member or bar.

Advantageously, on both sides of the applicator member, slide runners are arranged which are mounted for movement relative to the applicator member and the housing in a direction perpendicular to the substrate plane.

An important feature of the invention is that the adhesive film transfer can be effected in an edge-sharp manner from the carrier tape to the substrate. This presents a significant advantage over glue pencils, glue bottles and other applicators which can be used to apply an adhesive film to the surface but cannot do so with a guaranteed clean edge. The clean edge applies not only to where the film remaining on the tape tears away from the adhesive film on the substrate, i.e. the beginning and end edges of the adhesive film strip, but also to the longitudinal edges of the adhesive film.

A poorly torn edge between the remainder of the film on the carrier tape and the film applied to the substrate not only means that the terminal end of the applied film will be irregular but also that the starting edge of the film to be next applied will be irregular.

Experiments have shown that the quality of the tear edge which is actually formed, is largely dependent upon the angle at which the application is lifted from the substrate.

By the use of elastically deflectable slide runners, we are quite surprisingly, able to achieve a uniform angle of lifting of the applicator member away from the substrate surface regardless of different manipulative techniques by different users so that practically in all cases a sharply defined, high quality tear edge is achieved.

A further improvement in the quality of the tear edge is achieved, in accordance with the invention, by providing the applicator member with at least one cam engageable in a control curve of the slide runners. Naturally, it is also possible to provide the slide runners with a cam and the applicator member with a corresponding control curve.

The relationship between the cam and the control curve means that the movement of the slide runners is coupled to the elastic oscillating movement of the applicator member so that especially the movement of the applicator member at the final stage of adhesive film application is coordinated with the movement of the slide runners to achieve the most desirable angle of lift off of the tape. The elastic mounting of the applicator device or member can be used for elastic prestressing of the slide runners in the direction of the substrate.

This is advantageous also from the point of view of fabrication of the apparatus since no additional spring parts are required then for the prestressing of the slide runners.

When the applicator is not in use, the slide runners project beyond the applicator member so as to protect the adhesive film from contact with a standing surface upon which the applicator can rest. This greatly facilitates the handling of the device.

It has been found to be advantageous further to provide the control curve with a notch in which the cam can be indexed to thereby provide a secure but releasable connection between the applicator member and the slide runners.

In accordance with a further feature of the invention, the control curve is so configured that upon the rise of the slide runners in the direction of the applicator member, the applicator member is swung in the direction in which the tape is drawn off to the spool. This ensures that a starting of the adhesive film transfer will require the runner pair to be pressed against the substrate. The pressing of the device thereby causes the applicator member and the tape carrying the adhesive film to move with a forward inclination and the adhesive film to come into contact with the substrate.

According to yet another feature of the invention, the control curve is so shaped that upon a swing of the applicator member in the direction of tape feed, conversely the slide runners are lifted in the direction of the applicator member. Thus when the device is pressed against the substrate in use, the runner pair can be so lifted above the region of film application that adhesive-carrying tape is pressed against the substrate while the slide runners are lifted out of engagement with the substrate. These movements do not require any special action on the part of the user and are effective upon simple pressing of the applicator against the substrate and the drawing of the applicator along the substrate.

At the end of adhesive film transfer, the device is simply lifted from the substrate and the tearing mechanism then becomes automatically effective upon pressure relief of the slide runner pair. The curve and cam arrangement displaces the member in an inclined manner away from the substrate to tear the adhesive film at the optimum angle.

A further advantage of the runners is that they ensure proper orientation of the device when it is set upon the substrate. The runners then function as outriggers which ensure a correct orientation of the device for the subsequent adhesive transfer and for retraction of the device after the transfer of the adhesive film.

We have found it to be desirable, moreover, from a point of view of fabricating the device, to provide the supply spool, the take-up coil, the applicator member and the drive means coupling the supply spool with the take-up means forming the coil on a base plate.

Particularly in this embodiment, the slide runners can be provided on a lever arm articulated to the housing.

The base plate can, at comparatively low cost, be swingably mounted on the housing so that it can swing into a housing chamber for up or out of the housing chamber for replacement of the supply spool and removal of the take-up coil.

To latch the base plate in the housing, the base plate is provided with an undercut opening in at least one side wall of the housing and which preferably has the shape of a circular arc segment. The lever arm can have a circular arc segmental tongue which latches in this opening when the base plate is swung into the housing.

The lever arm, therefore, not only forms a carrier for the slide runners, but also is a closure cap which is articulated generally midway of one side of the base plate.

The circular arc segmental tongue engages in the undercut opening in the latched state much like the closure of a sheet steel gasoline canister whose closure engages in a housing opening and ensures a firm connection between the housing and the base plate.

When the cam is indexed in the control curve, a secure connection is provided and the lever is not permitted to return to the open position.

When the circular segmental closure tongue and the housing are provided in contrasting colors at least in the region of the undercut opening, the user can readily understand the closure principle without detailed study of the closure operation.

With respect to the facilitated handling in film transfer, the invention has been found to be advantageous also because the base plate can be made in the shape of an obtuse-angle triangle with the housing having a similar shape. At one vertex of this triangle having an acute angle, the applicator member is provided. When the applicator device comprises an applicator bar, the applicator member can be most readily provided and formed as part of this plate. An effective guide is thereby formed for the tape. The housing can have an ergonomically optimal shape, e.g. that of a wedge is readily held in the fist of the user, while permitting the applicator member to transfer the adhesive film to the substrate with a maximum of precision.

The supply spool should be placed as closely as possible to the applicator member, i.e. at the smallest distance therefrom permitted by the diameter of the full spool. The axis of the supply spool should preferably lie along the angle bisector at this acute angle end of the triangle.

In the region of the obtuse angle vertex of the triangle, the take-up means or take-up coil is provided. For the take-up coil, significantly less space is required since the support tape, upon removal of the adhesive film therefrom, requires much less space.

In the region of the second acute angle vertex of the triangle, a chamber or compartment is provided which defines a cylindrical space to accommodate a replacement spool of the tape provided with the adhesive.

The side between the two acute angles of the triangular base plate is preferably formed as a support surface for the device. With the above-described construction, the space utilization is extremely effective because it allows the replacement spool to be carried in the device with small external dimensions of the latter. It is also possible to provide between the supply spool and the replacement spool, a space for the housing closure or latch system.

The drive means between the supply spool and the take-up coil is advantageously formed as a closed compartment or chamber on the base plate. By this enclosure of the drive device, contamination by adhesive particles is prevented. In case any adhesive residue might tend to accumulate on the surface of the base plate, it can be removed easily by a solvent and it is, therefore, advantageous to make the housing, including the base plate and the parts on the housing which might be exposed to the solvent, from a solvent-resistant material such as a polyolefin.

The drive means, moreover, is so provided that the coil or take-up means will continuously apply a tension to the strip either through the use of an overrunning transmission or the gear drive with a slip clutch. The tension is generated by the drive element of the drive mechanism which is the supply spool and the mechanism generating the tension must be able to prevent any rotation of the take-up coil counter to the drive direction which might tend to loosen the strip. If the device is moved across the substrate counter to the adhesive film application direction, the strip might loosen and form a loop which might allow adhesive from the strip segment between the supply spool and the applicator, to move into the housing.

To avoid such undesired loop formation, it is a feature of the invention that the drive mechanism includes an anti-reverse lock resisting reverse rotation of either the coil or the spool. This allows with simple and inexpensive means the device to maintain the strip in a continuously stretched or tensioned state. By contrast with conventional devices which require user activation of a brake, the anti-reverse lock of the invention can be completely automatic.

The anti-reverse lock can be provided with a pawl-and-ratchet mechanism which can include a gear engaged by a resilient tongue to hold the strip under tension. The fact that the strip is continuously under tension has also been found to be advantageous on the initial placement of this device on the substrate and the beginning of the film transfer movement to ensure an edge-sharp starting edge for the applied adhesive film.

According to a further feature of the invention, the slip clutch is provided between a mandrel receiving the supply spool and a drive gear carrying the mandrel. Especially advantageous is a construction in which the interior of the mandrel is splined or toothed and has teeth which are engaged by inclined spring-loaded pawls which are fastened on the drive gear on which the mandrel is carried. This slip-clutch arrangement thus effectively utilizes a spline hub and pawls engaging same to generate, with continuous strip advance, periodic resistance peaks at a rate depending upon the pitch of the teeth which can be readily established in accordance with the adhesive quality. That eliminates the need for a hand-operated brake device to ensure a uniform strip tension.

Because of the inclined orientation of the spring pawls depending upon the direction of rotation, the dragged pawls can provide a reduced-slip resistance and the pushed pawls, a higher resistance. This device can be used to supply the higher resistance during transfer operation and a smaller resistance for resetting upon strip change by rotation of the take-up coil. The tensioning of the strip during a strip change, therefore, can be accomplished without any great expenditure of force.

To improve the handling of the device, it has been also found to be advantageous to provide a viewing window opposite either the take-up coil or the supply coil or both to allow the degree of filling of the device to be readily ascertained.

The spool core of the supply spool, generally in the region of the site window, can be provided with a color code which indicates the nature of the adhesive.

The viewing window can generally be located in a region of the device which is covered by the hand of the user and can be rectangular with small sides running parallel to radii of the supply spool so that the longitudinal dimension of the window can extend over the entire coil of the pool and the core thereof.

According to yet another feature of the invention, the housing is made generally flat and a small side above the applicator is provided with a hump-shaped finger rest which allows the finger to press the housing directly above the applicator member against the substrate. The overall shape of the housing has a paw-grip shape which can be readily held in the hand of the user as an ergonomic advantage. By rounding the corners of the basic triangular shape and providing the hump-shaped nose as a finger brake or finger rest upon radius of curvature increases away from the finger rests, we achieve a contour characteristic that allows the device to be held easily in the hands of individuals having different hand sizes and yet apply a substantially uniform pressure with and to the device.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
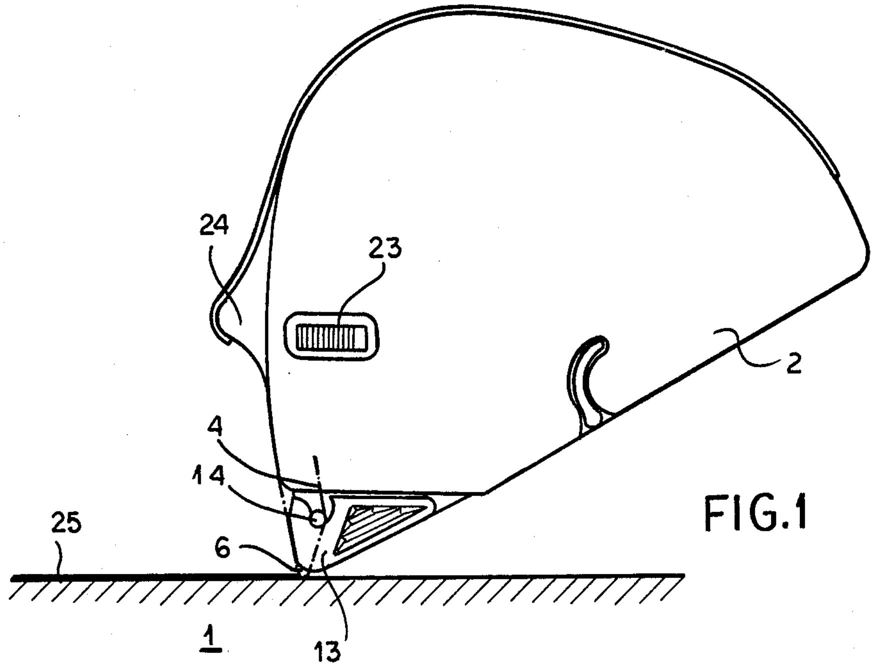
FIG. 1 is a side elevational view of the adhesive film applicator according to the invention seen in a position thereof in which it is in the course of applying an adhesive film strip to a substrate.

In FIG. 1 we have shown a substrate 1 which is to be provided with a strip of adhesive film 25, i.e. a so-called dry adhesive for the attachment of a photograph, for the dry mounting of some other sheet, leaf or material on the substrate, or the like.

For that purpose, according to the invention, a housing 2 is provided for an applicator device and has generally the form of an obtuse triangle. The device has a thickness of 1.5 to 2.5 cm, preferably about 2 cm, and can be held in the hand like a wedge gripped by the fist so that a hump-shaped formation 24 along one edge of the housing can form a finger rest.

To apply the adhesive film, the housing 2 is pressed against the substrate 1 while being held in the hand of a user so that a strip of tape 4 carrying the adhesive film and passing around an applicator member or bar 6 is pressed against the substrate. The film adheres to the substrate with a greater tenacity than to the tape and thus remains adherent to the substrate as the tape is drawn away from the substrate.

In this operation, a pair of slide runners 13 which straddle the application member 6 on opposite sides thereof like the fingers of a fork, are pressed upwardly by the substrate toward the housing 2. The lifting of the runners 13 from the substrate is effected by a cam 14 connected with the applicator member 6 and which engages in a corresponding control curve or cam follower of the slide runner 13 and will be described below in greater detail.

The applicator member 6 is provided at a corner of the housing corresponding to a vertex with an acute angle thereof so that, for accuracy in application, the relatively heavy and inaccessible parts can be located somewhat remote from the applicator member within the housing while the applicator member itself is a point-like structure extending out of the housing and applicable against the substrate with great precision.

Figure 2:
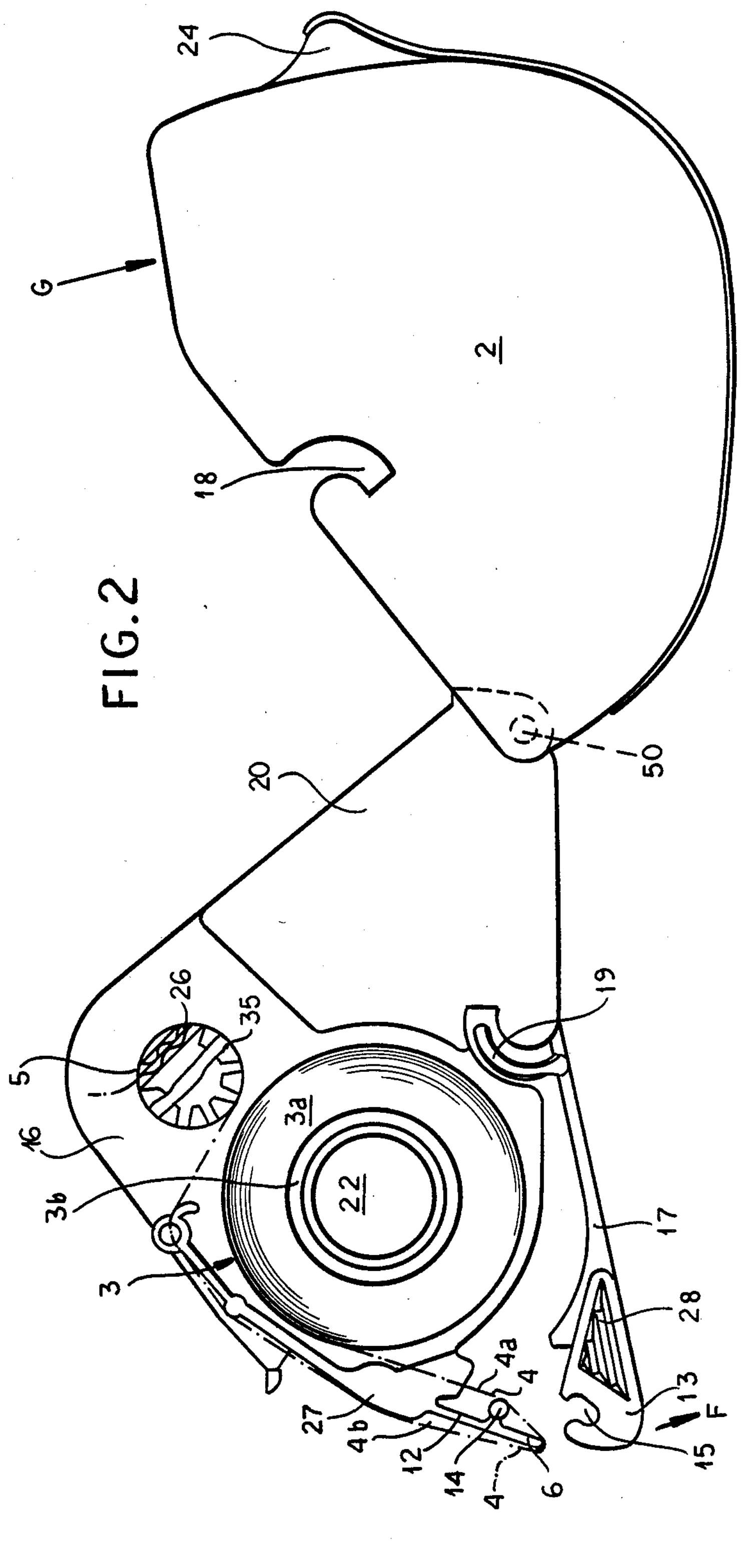
FIG. 2 is a similar view of the device but with the housing window away form the base plate and the mechanism carried thereby, i.e. the device in an open condition.

In FIG. 2, we have shown the device of FIG. 1 but with the housing 2 swung away from the base plate, i.e. with the device opened.

By swinging the housing 2 away from the base plate, the base plate 16 becomes visible, and it can be seen that the base plate 16 is articulated to the housing 2 at a pivot 50 at another acute angle vertex of the triangular shape of the housing 2 and an acute angle vertex of the triangular shape of the base plate 6.

A supply spool 3 for the tape 4 which carries the adhesive film is rotatably mounted on the base plate 16. The supply spool 3 comprises the coil *3a* of the tape and the coil core *3b*.

The coil core *3b* is seated on a mandrel 22 upon which the supply spool is rotatable. The coil *3a* is wound around the core *3b*.

A take-up means 5 is likewise rotatably mounted on the base plate 16 to form a coil of the tape *4b* from which the adhesive film has been stripped by contact of this film with the substrate. The take-up member 5 has a slit 26 with an inclined inlet portion and a zigzag shape to permit the tape *4b* to be engaged in the member 5.

A grip 35, which is ridged to prevent slipping, enables the take-up coil to be rotated by hand to tension the tape between the supply coil and the take-up spool. The supply spool and the take-up coil are coupled by a drive means which will be described below and which includes a slip clutch.

The base plate 16 also is formed with a tape guide device 27 which is fastened to the base plate or is formed in one piece with the latter at an acute angle vertex thereof. At one end of this tape-guide device 17, the applicator bar 6 is formed.

The applicator bar 6 can thus project at this corner of the base plate and housing.

The applicator bar 6 is connected by an intermediate piece 12 of reduced wall thickness with the remainder of the tape guide and the housing, the member 12 forming an elastic means connecting the applicator member 6 with the housing.

By elastic deformation of the intermediate member 12, an oscillating movement can be imparted to the applicator member 6 which also can be put under slight torsion by the tensioned band so that the member 6 is resiliently pressed against the substrate when the housing 2 is pushed toward the latter (FIG. 1).

In FIG. 2 only one of the cams 14 is visible but it will be understood that the applicator member 6 has two such cams which extend in a direction perpendicular to the plane of the base plate.

The base plate 16 is provided in the region of the other acute-angle vertex with a compartment 20 adapted to receive a supply spool which has not been illustrated but is identical to the spool 3 and will be described here as a spool, i.e. a full spool which can be substituted for the spool 3 shown when that spool is empty of its coil.

The compartment 20 is open at its small side lying between the obtuse-angle vertex and the other acute-angle vertex so that the replacement spool can easily be inserted and removed. On the upper surface of the compartment 20, a brief service-instruction set can be printed. Because of the Figure selected, the service instructions are not visible in the drawing.

As can be seen from FIG. 2, the tape carrying the adhesive film *4a* is drawn from the supply spool 3 and passes around the applicator bar 6, engaging the latter with its side opposite that carrying the adhesive film. At the applicator 6, an adhesive film is stripped from the tape which then passes at *4b* via the tape guide 27 into the region of the take-up coil 5. The direction of rotation of the take-up coil 5 is, as is also described below, so selected that the adhesive side of the tape can come in contact with the coiling core.

On the side of the triangular base plate 16 between the two acute-angle vertices and substantially midway therealong, a lever 17 is articulated. This lever can swing in the direction of the arrow F.

At its free end, the lever 17 carries the slide runners 13 which have been mentioned previously and are disposed to opposite sides of the applicator member 6 in a fork-like pattern. The slide runners 13 thus straddle the member 6 when the lever 17 is swung in the clockwise sense (FIG. 2) opposite the direction of arrow F.

The walls of the slide runners 13 are formed with control curves or cam followers 15 in the form of recesses or notches in which the cams 14 can index.

On the outer wall of each slide runner 13, a ribbing 28 is provided which can be gripped securely by the fingers of the user to enable the device to be pulled open.

Close to the articulation of the lever 17, the latter is formed with a circular arc-segmental tongue 19 extending generally perpendicular from the lever 17 in the direction of the base plate 16 and whose arcuate configuration is so selected that its center of curvature corresponds to the articulation of the lever 17.

The housing 2 comprises two generally triangular plates which are held together on two external small sides and which correspond generally to the form of the base plate 16. On one of the small sides which lies above the applicator member 6 in the closed condition of the device, the finger rest 24, previously described, is provided. On the opposite side, which lies in the region of the lever 17 in the closed condition of the housing, an opening 18 which has generally the form of the arc-segmental tongue 19 is provided to be engaged by this tongue and latch the plate 16 in the housing.

The housing 2 thus encloses the base plate 16 like a hood. This has the advantage that the internal parts can be completely enclosed by a hood structure with large-radius corners and absolute symmetry so that the device is suitable for right and left handed users with exactly the same type of handling.

To open the device, a lever 17 is gripped at the ribbing 28 on opposite sides between the thumb and index finger and can pull in the direction of the arrow F away from the housing which can be held in the other hand.

The cam 14 is thereby pulled out of the notch of the control curve 15 with slight deformation of the elastic intermediate member 12. The lever 17 swings in the direction of arrow F until the segmental tongue 19 is completely withdrawn from the opening 18 in the housing 2, whereupon the plate 16 is pulled out of the housing and the apparatus assumes the condition shown in FIG. 2.

In this condition, the interior of the device is completely accessible as may be necessary for replacement of the tape or for cleaning. A supply spool 3 is seated upon the mandrel 22. The latter engages via an entraining connection with the drive with a type of spline shaft/spline hub connection as is further described. The tape 4 is drawn around the applicator bar 6 and fed into the take-up coil 5 where it is engaged in the receiving slit 26. With several manual rotations of the take-up spool, the tape end is securely fixed thereto. The fastening of the band end does not require the take-up slit. By bringing the adhesive side of the tape into contact with the side of the take-up spool 5, we can ensure an automatic or manual connection between them directly or via a leader without the need to rotate the take-up coil to bring the take-up slit into position.

The supply spool 3 is connected with the take-up coil 5 by a slip clutch in a drive mechanism as is described further below.

To close the device, the housing 2 is swung in the counterclockwise sense with respect to the base plate 6, i.e. opposite the arrow G, or conversely, the base plate 16 is formed in the clockwise sense in the housing opposite the direction of the arrow F. The lever 17, to latch the base plate in the housing, swings also in the clockwise sense about its articulation to bring the tongue 19 into engagement in the openings 18 in the housing walls. The lever 17 is then forced toward the base plate until the cam 14 indexes in the control curve 15 with a slight elastic deformation of the intermediate piece 12.

For application of the adhesive film to a substrate (see FIG. 1), the device is held as shown in FIG. 1 and pressed against the substrate 1. The slide runners 13 contact the substrate 1 first.

With further pressing of the device against the substrate, lever 17 is swung in the clockwise sense relative to the housing about its articulation until the application member 6 projects beyond the level of the slide runners and presses the tape with its adhesive film 4a thereagainst.

By selection of the shape of the control curves 15, in the side walls of the solid runners 13, the applicator bar 6 can be pressed forwardly via the cams 14, i.e. opposite to the direction of movement of the device which is drawn from left to right across the substrate as viewed in FIG. 1. This member 6 is then also drawn along the substrate to permit the adhesive film to be applied thereto. The shape of the curve 15 can also be such that, when the applicator member 6 is pressed against the substrate, the runners 13 are lifted from contact therewith.

Any unevenness of the substrate encountered by the device as it is drawn along the latter is compensated by the elastic mounting at 12 of the applicator member 6 so that an edge-sharp adhesive transfer is ensured.

After termination of an adhesive transfer operation, the member 6 springs back into this equilibrium position whereby the runners 13 are again moved to project beyond the applicator member 6 via the cams 14 and the cam followers 15, thereby elevating the member 6 from the substrate.

This elevation of the applicator member 6 is effected based on the geometry of the device and can be arranged to ensure an optimal straight-line tearing edge of the film. The tearing conditions can largely be independent, therefore, of the particular manner in which the device is handled by the user.

The base plate 16 can be of double-shell construction so that in the hollow space between two shells, the gears for the drive means between the supply spool 3 and the take-up coil 5 can be received.

The double-shell construction provides a substantially hermetic encapsulation of the drive mechanism to ensure that the gear wheels will remain free from adhesive residues which might adversely affect their functioning.

Figure 3:
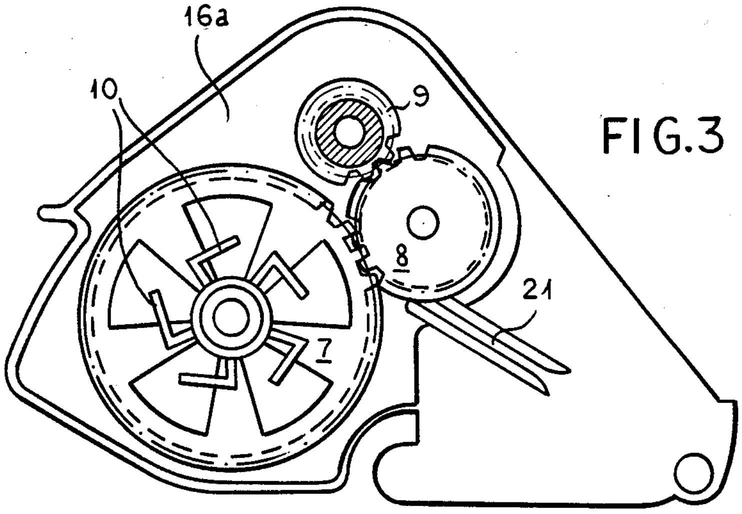
FIG. 3 is an elevational view of the base plate showing the drive mechanism thereof and with any cover structure for the structure of the drive mechanism seen removed.

In FIG. 3, the upper half-shell has been shown to be removed and only the lower half-shell remains visible at **16*a***.

The drive mechanism is seen to comprise three gear wheels 7, 8, 9.

On the drive gear wheel 7, which lies below and is coupled to the supply spool 3, five spring pawls 10 are arranged to form part of a slip clutch.

The gear 7 meshes with an intermediate gear 8 which drives the further pinion 9.

The pinion 9 is formed in one piece with the take-up core 5 on which the take-up coil is wound.

The teeth of the intermediate wheel 8 form a ratchet which is engaged by a spring pawl 21 mounted on the lower half-shell **16*a* to function as the direction lock, permitting only unidirectional rotation of the gear 8 and preventing back rotation. The member 21** thus functions as an anti-reverse lock.

By the choice of the transmission ratio, the coil 5 can always be driven at a sufficiently rapid rate to fully wind up the tape drawn for the supply coil 3 to maintain the tension of the latter.

The anti-reverse lock formed by the pawl 21 and the ratchet 8 maintains the tape 4 under tension and permits a reverse rotation which cannot cause loop formation in the tape.

The second half-shell which has not been illustrated in FIG. 3 is mounted on the half-shell **16*a*** by a pin and sleeve plug-type connection, not shown, and well known in the art cf assembling plastic casing members.

The two casing members **16*a*, etc., receive the gears 7–9 with a clearance of only several millimeters to ensure that the gears remain in proper positions and define the compartment 20** in which the replacement spool can be received and in which the half-shells of the housing may have a greater spacing to accommodate the replacement spool.

Figure 4A:
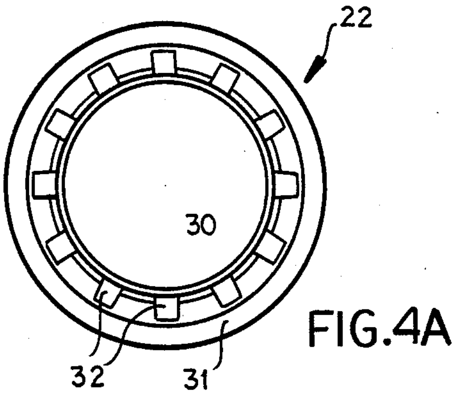
FIG. 4A is a plan view of the supply spool mandrel.
Figure 4B:
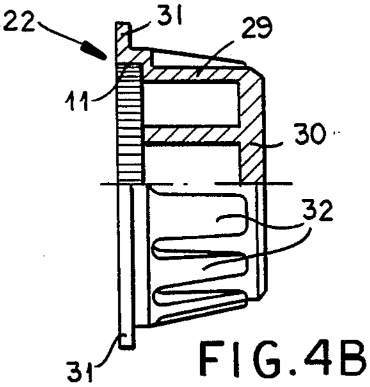
FIG. 4B is a side elevational view of the mandrel, partly in axial section.

The gear 7 carries the mandrel, best seen in FIGS. 4A and 4B.

The mandrel 22 shown in FIGS. 4A and 4B comprises a substantially cylindrical part 29 whose axial height corresponds substantially to the width of the tape 4.

At one end the cylindrical part 29 is closed by a cover plate 30 with which it can be integrally embedded at the open end of the mandrel, the cylindrical part 29 has a transition to an enlarged flange 31 for positioning the mandrel in the housing against tilting.

The outer periphery of the cylindrical part 29 is formed with ribs 32 whose height (i.e. radial dimension) decreases toward the end of the mandrel 22 closed by the cover plate 30 so that a generally conical outer profile is formed of a male splined member.

On the inner wall of the mandrel, axial flutes 11 are provided.

Figure 5A:
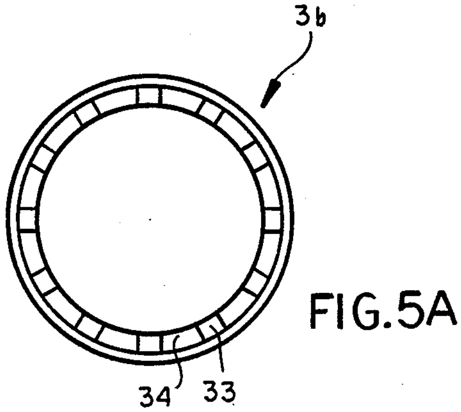
FIG. 5A is a plan view from below of the winding core of the supply spool.
Figure 5B:
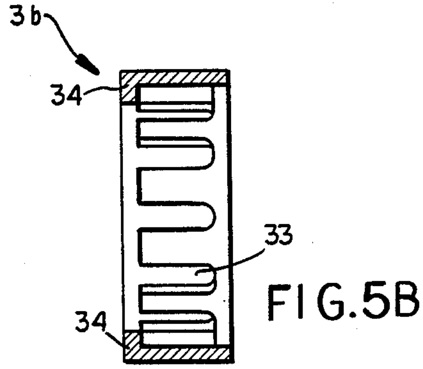
FIG. 5B is an axial section through this winding core.

The mandrel 22 rides on the gear 7 and the elastic pawls 10 can engage in the axial flutes 11 to form a slip clutch therewith. The mandrel 22 is held in the axial direction by the upper half-shell of the base plate 16 which can have a circular opening through which the mandrel projects and of diameter which is only slightly smaller than that of the flange so that the flange can axially engage the shoulder formed by the rim of this opening The core *3b* of the supply coil has the configuration shown in FIGS. 5A and 5B. The coil core *3b* comprises a cylindrical member which is open at both axial ends and on the periphery of which the tape (not seen in FIG. 5A or FIG. 5B) is wound.

On the inner wall uniformly spaced ribs 33 are arranged. These ribs have a width less than the spacing of the ribs 32 on the outer periphery of the mandrel 22. At one end, the mandrel *3b* has an internal annular shoulder 34.

The core *3b* of a full supply coil can be pressed onto the mandrel 22 and is received thereon with a slight play, the ribs 32 of the mandrel engaging the ribs 33 of the core *3b* in a form-locking entraining connection of the type formed by a spline shaft and a splined hub.

The conical taper of the ribs 32 facilitates the mounting of the spool on the mandrel 22.

Because the diameter of the internal shoulder 34 is less than the diameter of the envelope of the ribs 32, the core cannot be placed over the mandrel with an incorrect orientation. This prevents the supply spool from delivering the tape in the wrong direction.

Of course with the correct orientation of the supply spool, the latter will readily fit over the mandrel. The rib and groove connection also facilitates removal of the empty supply spool. Because of the rib and groove connection, moreover, the supply spools which are not designed for the device cannot be mounted on the mandrel.

Figure 6:
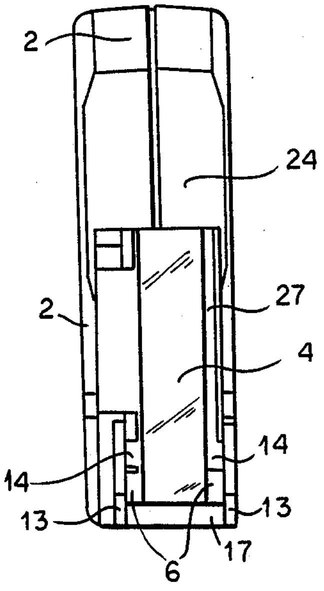
FIG. 6 is a front elevational view of the device of FIG. 1.

FIG. 6 shows the apparatus in its closed position from a front view in which the finger rest 24 is clearly visible. In the region in which the tape is guided, the housing is open so that it can easily be observed how the tape 4 passes around the bar 6 and is guided form the latter to the take-up spool.

The window 23 is shown to be elongated and to extend radially along the supply spool with ends of the window extending generally perpendicular to the substrate.

The base plate and housing are swung open and the accumulated depleted coil on member 50 is pulled off and discarded. The empty core *3b* is likewise removed and a new supply spool is mounted in place and the tape threaded along the path described.

The splitting of the anti-reverse lock secures the supply spool against loosening of the tape even in servicing or preparatory for use under conditions in which the spools are not in engagement with any drive and might otherwise undergo uncontrolled loosening.

The take-up core can be replaced by a pin in another construction in which the replacement spool is associated with a take-up spool and a leader can extend between these spools to permit the two spools to be placed on the plate 16 simultaneously and the leader looped around member 6.

We claim:

1. A device for applying an adhesive film to a substrate, comprising:
- a housing;
- a supply spool of a strip of a carrier tape provided with said adhesive film on one side of said tape such that said film is more readily adherent to said substrate than to said tape;
- take-up means in said housing forming a coil of said tape from which said adhesive film is removed by adhesion to said substrate during passage from said supply spool to said take-up means;
- drive means coupling said supply spool with said take-up means and including a slip clutch for rotating said take-up means upon rotation of said supply spool at a rate maintaining said tape taut between said supply spool and said takeup means;
- an applicator member around which said tape passes between said spool and said takeup means and engaged by an opposite side of said tape;
- mounting means for elastically mounting said applicator member on said housing so that said applicator member resiliently presses said tape with said adhesive film thereon against said substrate whereby said adhesive film is peeled off said tape to adhere to said substrate as said tape passes across said member to said coil; and
  - a pair of slide runners flanking said applicator member, lying in respective planes perpendicular to said substrate and elastically biased against said substrate.

2. The device defined in claim 1 wherein said applicator member is an applicator bar.

3. The device defined in claim 2 wherein said mounting means is an elastically bendable generally rectangular intermediate member connected to said bar and to said housing.

4. The device defined in claim 1 wherein said applicator member is formed with at least one cam engageable in a control curve formed on at least one of said slide runners.

5. The device defined in claim 4 wherein said cam and said control curve are constructed and arranged to index said cam in a notch of said curve.

6. The device defined in claim 4 wherein the control curve is so constructed that upon a rise of the runners in the direction of said applicator member, the applicator member is swung in the direction of advance of said tape from said spool to said coil.

7. The device defined in claim 4 wherein said control curve is so shaped that upon a swing of the applicator member in the direction of advance of the tape from the spool to the coil, the runners are lifted in the direction of the applicator member.

8. The device defined in claim 1, further comprising a base plate carrying said supply spool, the takeup means and coil, said drive means and said applicator member and received in said housing.

9. The device defined in claim 8, further comprising at least one arm pivotally connecting said runners to said base plate.

10. The device defined in claim 9, further comprising means pivotally mounting said base plate in said housing so that said base plate can be swung out of said housing.

11. The device defined in claim 10 wherein said housing is formed with a side wall having an undercut opening receiving an arcuate tongue formed on said at least one arm when said base plate is swung into said housing for latching said base plate therein.

12. The device defined in claim 8 wherein said base plate has generally the configuration of an obtuse triangle with an acute-angle vertex at which said applicator member is provided

13. The device defined in claim 12 wherein said base plate is provided with means for mounting said supply spool on said base plate close to said applicator member.

14. The device defined in claim 13 wherein said base plate has an obtuse-angle vertex, said takeup means and coil being provided close to said obtuse-angle vertex.

15. The device defined in claim 14 further comprising means defining a compartment on said base plate close to the other acute-angle vertex for receiving a spare supply spool.

16. The device defined in claim -wherein said base plate is provided with means defining a closed chamber housing said drive means.

17. The device defined in claim 1 wherein said drive means includes an antireverse stop.

18. The device defined in claim 1 wherein said drive means includes a mandrel receiving said supply spool and a drive gear on said mandrel, said slip clutch being interposed between said mandrel and said gear.

19. The device defined in claim 18 said slip clutch comprises axial flutes formed on an internal surface of said mandrel, and resilient pawls on a hub of said gear engaging said flutes.

20. The device defined in claim 19 wherein said supply spool has a spool core formed with an internal annular shoulder engageable with said mandrel to prevent tilting of the supply spool on the mandrel.

21. The device defined in claim 1 wherein said housing has at least one window juxtaposed with turns of at least one of said coil and said spool to permit detection of the consumption of said strip.

22. The device defined in claim 1 wherein said housing is generally flat and has a small side above said applicator member formed with a finger rest.

* * * * *

US004851076B1

REEXAMINATION CERTIFICATE (3908th)

United States Patent [19] [11] B1 4,851,076

Manusch et al. [45] Certificate Issued Oct. 26, 1999

[54] ADHESIVE FILM APPLICATOR

[75] Inventors: Christoph Manusch, Hanover; Hans J. Harp, Hemmingen, both of Germany; Roy van Swieten, BP s'Hereogenbosch, Netherlands

[73] Assignee: Henkel Kommanditgesellschaft Auf Aktien, Dusseldorf, Germany

Reexamination Request:
No. 90/005,343, Apr. 26, 1999

Reexamination Certificate for:

Patent No.: 4,851,076
Issued: Jul. 25, 1989
Appl. No.: 07/120,302
Filed: Nov. 13, 1987

[30] Foreign Application Priority Data

Nov. 13, 1986 [DE] Germany ................................ 3638722

[51] Int. Cl.$^6$ ........................................ B32B 35/00
[52] U.S. Cl. .......................... 156/577; 156/579; 156/584
[58] Field of Search .................................... 156/523, 527, 156/540, 577, 579, 584

[56] References Cited

U.S. PATENT DOCUMENTS

| | | |
|---|---|---|
| Re. 31,726 | 11/1984 | Sato . |
| 2,928,189 | 12/1960 | Frohbach et al. . |
| 3,265,553 | 8/1966 | Kind et al. . |
| 3,793,114 | 2/1974 | Thomas . |
| 3,813,274 | 5/1974 | Rothenberger . |
| 3,890,191 | 6/1975 | Mayer . |
| 3,930,697 | 1/1976 | Barouh et al. . |
| 3,947,313 | 3/1976 | Lichtwardt et al. . |
| 3,951,726 | 4/1976 | Found . |
| 3,969,180 | 7/1976 | Ravesloot . |
| 3,969,181 | 7/1976 | Seabold . |
| 4,008,119 | 2/1977 | Hermann . |
| 4,026,758 | 5/1977 | Sato . |
| 4,060,444 | 11/1977 | Schweig, Jr. et al. . |
| 4,112,536 | 9/1978 | Carson, Jr. et al. . |
| 4,274,906 | 6/1981 | Clar . |
| 4,288,276 | 9/1981 | Schrotz et al. . |
| 4,357,198 | 11/1982 | Ezquerro . |
| 4,447,482 | 5/1984 | Heinzelman et al. . |
| 4,525,237 | 6/1985 | Clar . |
| 4,576,311 | 3/1986 | Horton et al. . |
| 4,718,971 | 1/1988 | Summers . |
| 4,954,208 | 9/1990 | Hamisch, Jr. et al. . |

FOREIGN PATENT DOCUMENTS

| | | |
|---|---|---|
| 1 911 615 | 9/1969 | Germany . |
| 2 116 984 | 4/1972 | Germany . |
| 30 25 345 C2 | 7/1984 | Germany . |
| 34-16890 | 10/1959 | Japan . |
| 39-30114 | 10/1964 | Japan . |
| 51-49253 | 11/1976 | Japan . |
| 52-18318 | 4/1977 | Japan . |
| 58-148041 | 10/1983 | Japan . |
| 61-57370 | 3/1986 | Japan . |
| 61-241180 | 10/1986 | Japan . |
| 1009607 | 11/1965 | United Kingdom . |
| WO 83/02586 | 8/1983 | WIPO . |

*Primary Examiner*—Mark A. Osele
*Attorney, Agent, or Firm*—Connolly & Hutz; Harold Pezzner, Esq.

[57] ABSTRACT

An applicator for adhesive film to a surface has a supply spool for tape carrying the film and a take-up member coupled to the supply spool by a drive mechanism. The tape passes around an applicator member which is resiliently mounted on the housing and can press the tape against the substrate so that the adhesive film is transferred to the latter.

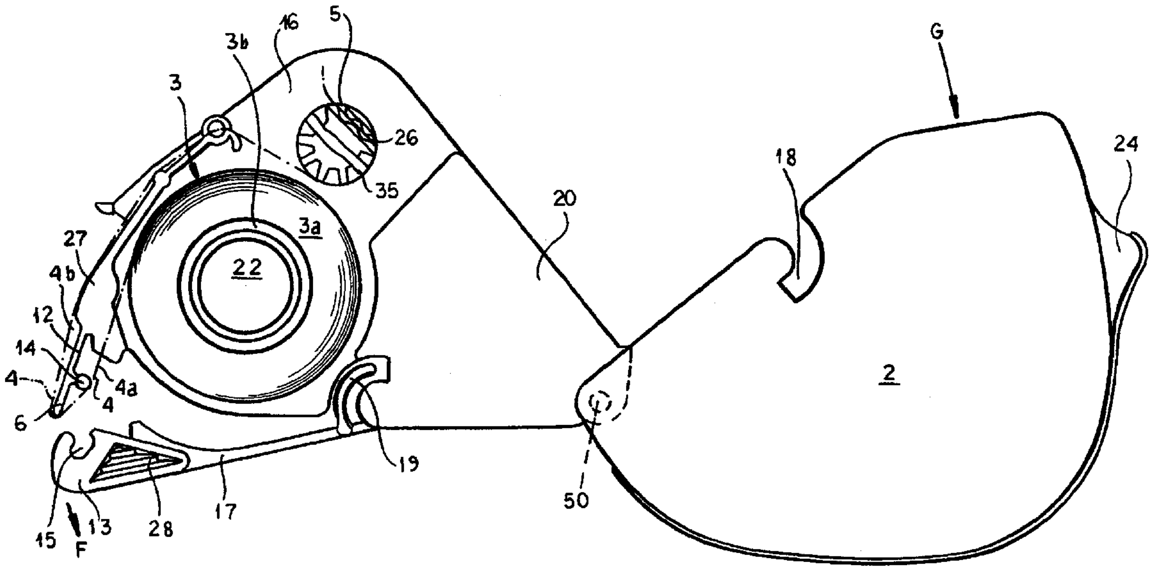

REEXAMINATION CERTIFICATE ISSUED UNDER 35 U.S.C. 307

The patent is hereby amended as indicated below.

AS A RESULT OF REEXAMINATION, IT HAS BEEN DETERMINED THAT:

The patentability of claims 1–3 is confirmed.

Claims 4–22 were not reexamined.

* * * * *